United States Patent
Yong et al.

(10) Patent No.: US 9,672,817 B2
(45) Date of Patent: Jun. 6, 2017

(54) METHOD AND APPARATUS FOR OPTIMIZING A SPEECH RECOGNITION RESULT

(71) Applicant: Kabushiki Kaisha Toshiba, Minato-ku (JP)

(72) Inventors: Kun Yong, Beijing (CN); Pei Ding, Beijing (CN); Huifeng Zhu, Beijing (CN)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/748,474

(22) Filed: Jun. 24, 2015

(65) Prior Publication Data
US 2016/0125874 A1 May 5, 2016

(30) Foreign Application Priority Data
Oct. 31, 2014 (CN) .......................... 2014 1 0602377

(51) Int. Cl.
| | |
|---|---|
| G10L 19/00 | (2013.01) |
| G10L 17/20 | (2013.01) |
| G10L 15/00 | (2013.01) |
| G10L 15/08 | (2006.01) |
| G10L 15/14 | (2006.01) |
| G10L 15/32 | (2013.01) |
| G10L 15/20 | (2006.01) |

(52) U.S. Cl.
CPC .............. *G10L 15/08* (2013.01); *G10L 15/14* (2013.01); *G10L 15/20* (2013.01); *G10L 15/32* (2013.01)

(58) Field of Classification Search
CPC ........... G10L 15/1807; G10L 2015/088; G10L 15/00; G10L 15/18

USPC ....... 704/253, 254, 252, 238, 239, 241, 243, 704/251, 255, 231, 232, 10
See application file for complete search history.

(56) References Cited

U.S. PATENT DOCUMENTS

| | | | | |
|---|---|---|---|---|
| 5,408,582 A | * | 4/1995 | Colier ................... | G10L 15/26 704/231 |
| 5,799,274 A | * | 8/1998 | Kuroda ............... | G10L 15/1807 704/239 |

(Continued)

FOREIGN PATENT DOCUMENTS

| | | |
|---|---|---|
| JP | 11-134335 A | 5/1999 |
| JP | 2004-258531 A | 9/2004 |

(Continued)

OTHER PUBLICATIONS

K. Ishikawa et al., "Correction of Speech Recognition Error Using Text Data," Journal of Natural Language Processing: The Association for Natural Language Processing, Oct. 10, 2000, pp. 205-227 (with English translation).

(Continued)

*Primary Examiner* — Akwasi M Sarpong
(74) *Attorney, Agent, or Firm* — Oblon, McClelland, Maier & Neustadt, L.L.P.

(57) ABSTRACT

According to one embodiment, an apparatus for optimizing a speech recognition result comprising: a receiving unit configured to receive a speech recognition result; a calculating unit configured to calculate a pronunciation similarity between a segment of the speech recognition result and a key word in a key word list; and a replacing unit configured to replace the segment with the key word in a case that the pronunciation similarity is higher than a first threshold.

5 Claims, 5 Drawing Sheets

(56) References Cited

U.S. PATENT DOCUMENTS

| | | |
|---|---|---|
| 7,120,582 B1 | 10/2006 | Young et al. |
| 7,418,386 B2 | 8/2008 | Lai et al. |
| 8,315,870 B2 | 11/2012 | Hanazawa |
| 8,666,739 B2 | 3/2014 | Jeon et al. |
| 2007/0185713 A1* | 8/2007 | Jeong .................. G10L 15/08 704/254 |
| 2008/0177541 A1* | 7/2008 | Satomura .................. 704/251 |
| 2008/0270118 A1 | 10/2008 | Kuo et al. |
| 2011/0196678 A1* | 8/2011 | Hanazawa ......... G10L 15/1807 704/251 |
| 2012/0290302 A1 | 11/2012 | Yang et al. |
| 2014/0019133 A1* | 1/2014 | Bao .................. G10L 15/22 704/257 |

FOREIGN PATENT DOCUMENTS

| | | |
|---|---|---|
| JP | 2005-084436 A | 3/2005 |
| JP | 2006-031278 A | 2/2006 |
| JP | 2010-123005 A | 6/2010 |
| JP | 2010-164918 A | 7/2010 |
| JP | 2010-525415 A | 7/2010 |
| JP | 2012-063545 A | 3/2012 |

OTHER PUBLICATIONS

Y. Okimoto et al., "Correcting Mis-recognitions Using Basic Travel Expression Corpus," The Institute of Electronics, Information and Communication Engineers (IEICE) Technical Report vol. 101 No. 521, Dec. 14, 2001, pp. 49-54 (with English translation).

* cited by examiner

METHOD AND APPARATUS FOR OPTIMIZING A SPEECH RECOGNITION RESULT

CROSS-REFERENCE TO RELATED APPLICATION

This application is based upon and claims the benefit of priority from Chinese Patent Application No. 201410602377.4, filed on Oct. 31, 2014; the entire contents of which are incorporated herein by reference.

FIELD

Embodiments described herein relate generally to a method and an apparatus for optimizing a speech recognition result.

BACKGROUND

In some application scenarios of speech recognition, the contents of speech usually include some key words. It is highly related to the user feeling of speech recognition system that the key words can be correctly recognized. For example, in a meeting assistant application in which speech recognition system recognizes the contents of the meeting speakers, the important person name, place name, technical terminologies and etc. involved in the meeting are key words. The recognition accuracy of key words is the most important performance indicator of such applications.

The key words can by classified into two categories. If a key word is not included in the system lexicon of the speech recognition system, it can be called as new word, and if another key word is included in the system lexicon, it can be called as core word. Because the new words are not registered in the system lexicon and the speech recognition system can only output the words that are existed in the system lexicon, the new words completely cannot be directly recognized.

Although most of the new words can be constructed by the existing words in the system lexicon and then output by recognizer indirectly, the example of such construction of new words are very rare in the training corpus, which cause very low language model (LM) scores of new words, so the probability of successful recognition of news words in this way is very small.

For the core words that are registered in the system lexicon, if other non-core word existing in the system lexicon with identical or similar pronunciation but higher LM score, the speech recognition system tends to wrongly select such non-core word as output result.

So, the recognition accuracy of key words for normal speech recognition system is usually very low, and the mis-recognized results are those words with identical or similar pronunciation to key words.

To improve the recognition accuracy of key words, it is a very critical point to increase the LM scores of key words. Generally, a class-based LM is used for such purpose. In this method, classes corresponding to some key word types can be built, e.g. class of person name, class of place name, class of technical terminology and etc., and a certain number of representative words that have the attribute of a class are selected from the system lexicon and added to the class. In LM training, the LM score of each class is calculated based on the statistics of all the representative words contained in that class. Before recognition, the key words are registered to the system lexicon and linked to the most suitable class. In recognition stage, a key word shares the LM scores of the class it belongs to. Because the LM scores of representative words are very high, the LM scores of key words are greatly increased and the recognition accuracy is efficiently improved consequently.

DETAILED DESCRIPTION

According to one embodiment, an apparatus for optimizing a speech recognition result comprising: a receiving unit configured to receive a speech recognition result; a calculating unit configured to calculate a pronunciation similarity between a segment of the speech recognition result and a key word in a key word list; and a replacing unit configured to replace the segment with the key word in a case that the pronunciation similarity is higher than a first threshold.

Below, the embodiments of the invention will be described in detail with reference to drawings.

<Method for Optimizing a Speech Recognition Result>

A first embodiment of the invention provides a method for optimizing a speech recognition result, comprising steps of: receiving a speech recognition result; calculating a pronunciation similarity between a segment of the speech recognition result and a key word in a key word list; and replacing the segment with the key word in a case that the pronunciation similarity is higher than a first threshold.

Figure 1:
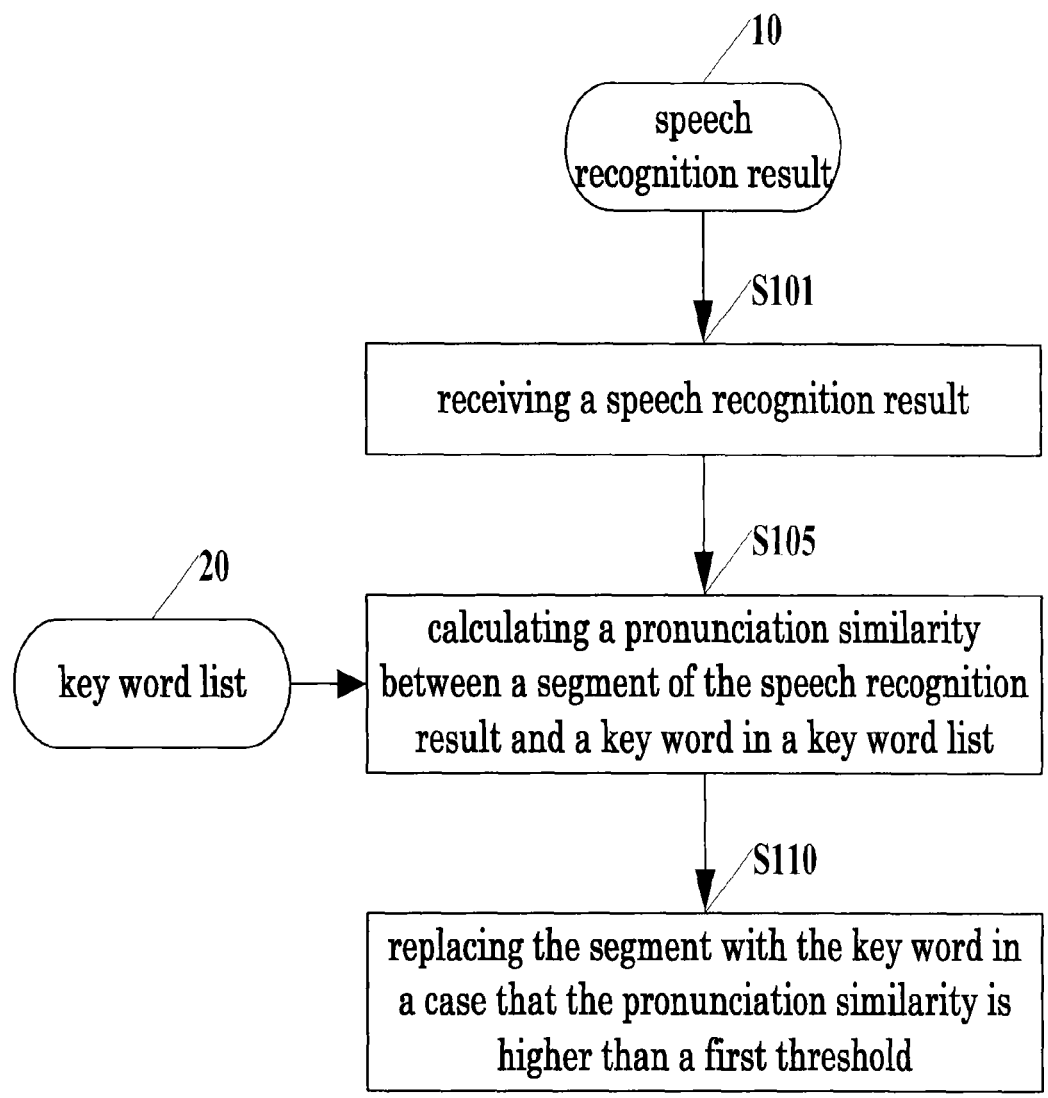
FIG. 1 shows a flowchart showing a method for optimizing a speech recognition result according to an embodiment of the present invention.

FIG. 1 shows a flowchart showing a method for optimizing a speech recognition result according to a first embodiment of the present invention. As shown in FIG. 1, first in step 101, a speech recognition result 10 from a speech recognition engine is received.

In the embodiment, the received speech recognition result 10 can be a result obtained through any speech recognition engine or system known by those skilled in the art and can be a speech recognition result of any language such as Chinese, English, Japanese etc., and the present invention has no limitation on this.

Next, in step 105, a pronunciation similarity between a segment of the speech recognition result 10 and a key word in a key word list 20 is calculated.

In the embodiment, the segment of the speech recognition result includes a word of the speech recognition result, a combination of a plurality of neighboring words of the speech recognition result, or a combination of a plurality of neighboring characters of the speech recognition result.

In the embodiment, the process of step 105 for calculating a pronunciation similarity is actually a process of matching the speech recognition result with the key word list, that is, a process of capturing wrongly output segment of the speech recognition result by using the key word list.

In step 105, preferably, matching is carried out from beginning of the speech recognition result, until matching is done for all the recognition result. Furthermore, to reduce calculation cost, it is also possible to match only a segment of the speech recognition result whose language model score is lower than the second threshold with the key word list. The language model score of the segment of the speech recognition result may be calculated based on a language model score of a word related to the segment, and the language model score of the word of the speech recognition result is data existing in the speech recognition result.

Figure 3:
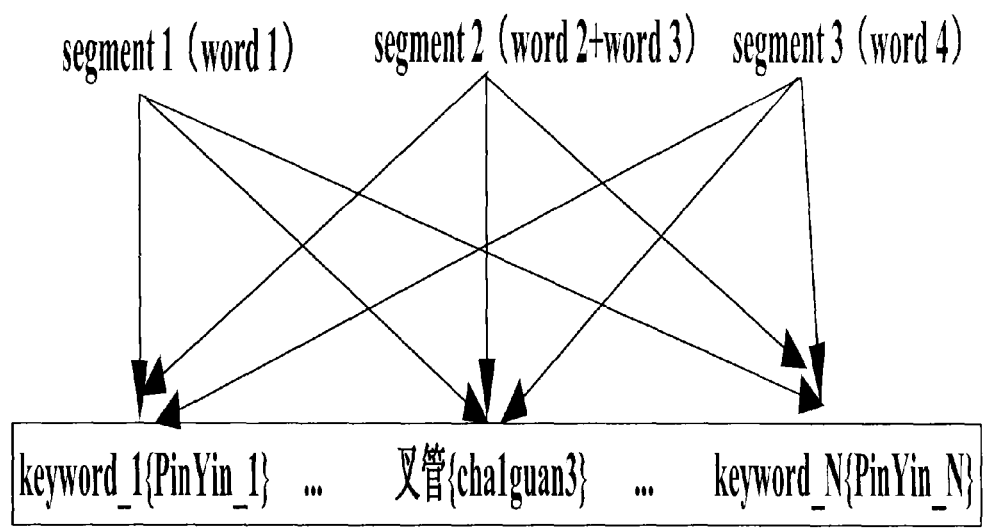
FIG. 3 shows an example of matching a speech recognition result with a key word list.

FIG. 3 shows an example of matching a speech recognition result with a key word list. As shown in FIG. 3, the speech recognition result "高强度 {gao1qiang2du4, LMS1} 茶 {cha2,LMS2} 果 {guo3,LMS3} 制作 {zhi4zuo4,LMS4}" comprises four words, language model score (LMS) of each word, and pinyin and tone of each character of each word. The key word list "keyword_1{PinYin_1}, . . . 叉管 {cha1guan3}, . . . keyword_N{PinYin_N}" comprises N key words, and pinyin and tone of each character of each key word.

In the example shown in FIG. 3, the second word "茶 {cha2,LMS2}" and the third word "果 {guo3,LMS3}" are combined into a segment, and each key word in the key word list is matched with three segments of the speech recognition result respectively, to obtain a pronunciation similarity between each key word and each segment.

In the example, although it is shown that, for all the key words, the second word "茶 {cha2,LMS2}" and the third word "果 {guo3,LMS3}" are combined into a segment, the embodiment is not limited thereto. For each key word, it is also possible to combine a plurality of neighboring words or a plurality of neighboring characters of the speech recognition result.

The matching method will be described below by taking "高强度 茶 果 制作" and "叉管" for example.

Speech recognition result: 高强度 茶 果 制作
Key word to be matched: 叉管
One matching method is word level fuzzy matching:
A segment to be matched will be one or more neighboring words, which at least comprise the following several similarity calculations:

茶<->叉管

茶果<->叉管

茶果制作<->叉管

果制作<->叉管

高强度茶果制作 <->叉管

. . .

Another matching method is character level fuzzy matching:
A segment to be matched will be one or more neighboring characters, number of types to be matched is larger than the first scenario, which at least comprise the following several similarity calculations:

强度<->叉管

度<->叉管

度茶<->叉管

茶<->叉管

茶果<->叉管

果制<->叉管

高强度茶果制作 <->叉管

. . .

Specific algorithm for the above matching methods may preferably be a dynamic planning algorithm, which may efficiently reduce time consumed by the algorithm.

In the embodiment, the pronunciation similarity between the segment and the key word refers to similarity degree of pronunciation of the two, which is preferably calculated through acoustic distance of the two. The smaller the acoustic distance of the two, the higher the similarity degree of the two. Calculation of acoustic distance will be described below in detail in conjunction with figures.

Next, in step 110, the segment is replaced with the key word in a case that the pronunciation similarity between the segment and the key word is higher than a first threshold.

In the embodiment, the first threshold and the second threshold may be set according to actual needs and the embodiment has no limitation thereto.

Figure 4:
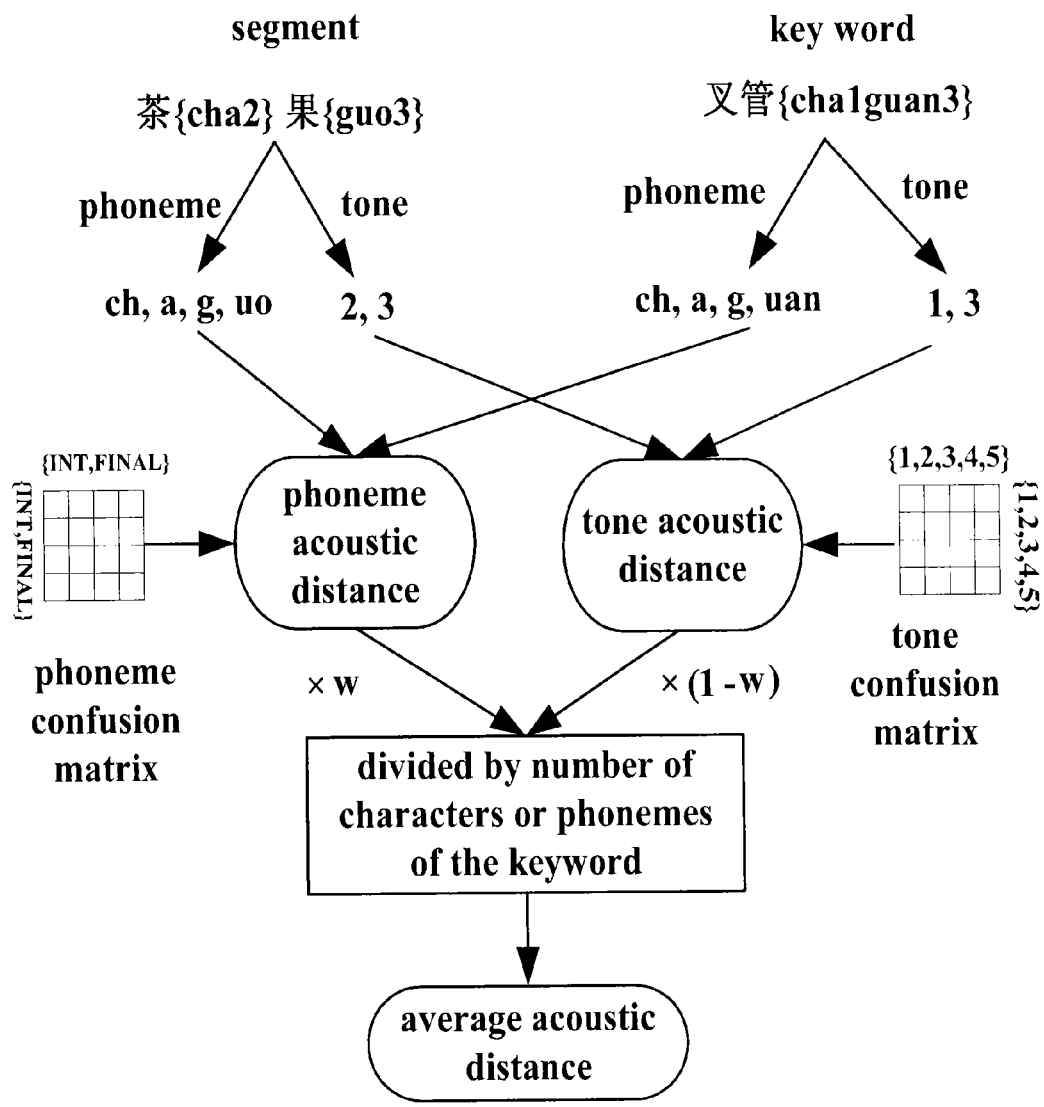
FIG. 4 shows a specific example of calculating an average acoustic distance.

Next, a preferred embodiment of the method for optimizing a speech recognition result of the invention will be described in detail in conjunction with FIG. 2 to FIG. 4.

Figure 2:
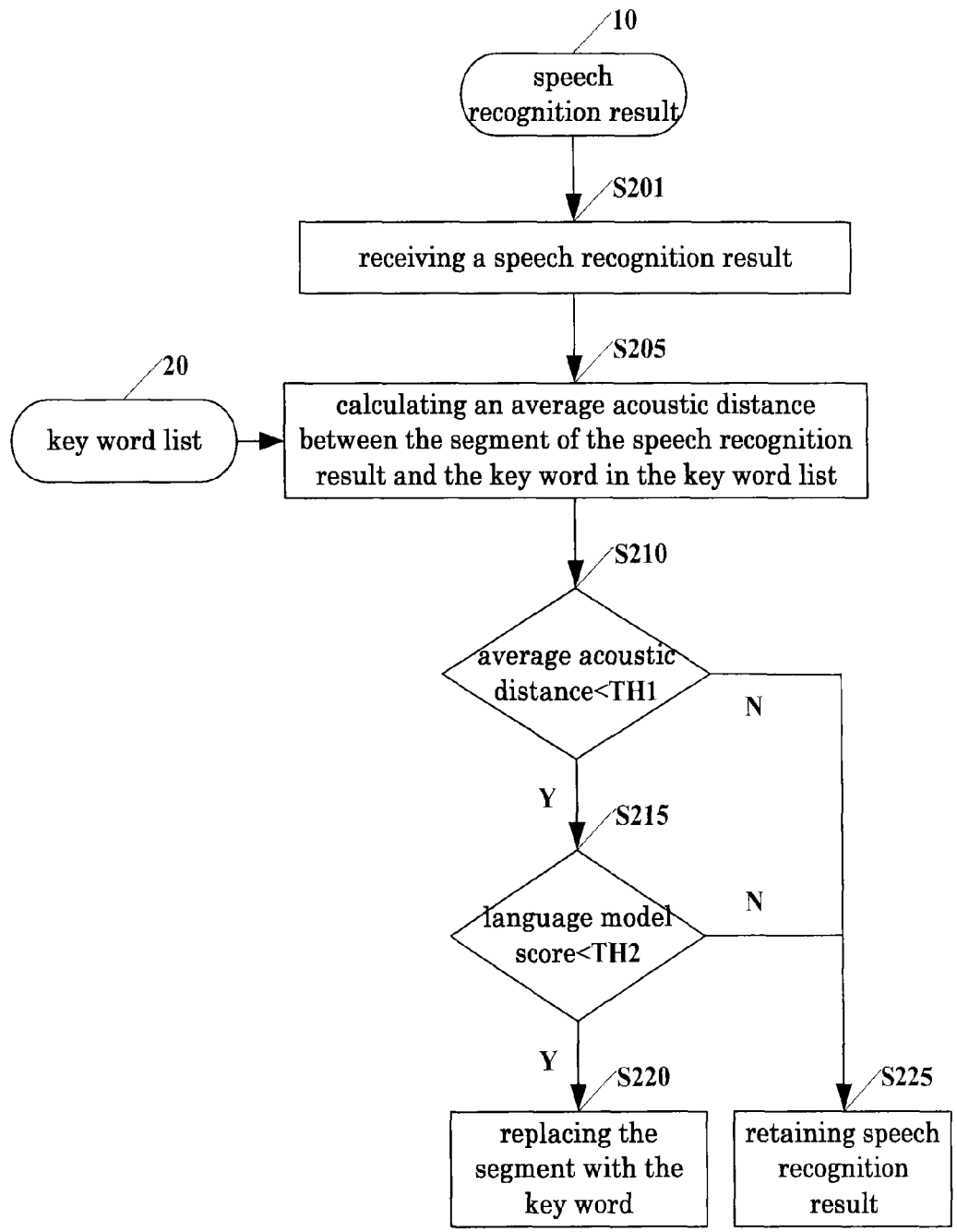
FIG. 2 shows a flowchart of a preferred embodiment of the method for optimizing a speech recognition result of the present invention.

As shown in FIG. 2, in step 201, like step 101, a speech recognition result 10 is received.

Next, in step 205, an average acoustic distance between the segment of the speech recognition result 10 and the key word in the key word list 20 is calculated.

In the embodiment, calculation of acoustic distance is to compare difference between a phoneme sequence of the segment of the speech recognition result 10 and a phoneme sequence of the key word, preferably, acoustic distance between each phoneme pair is weighted by a phoneme confusion matrix. Phoneme is a basic unit of pronunciation, for Mandarin language, the phonemes can be pinyins, or the pinyins can be split into consonants (Initials) and vowels (Finals), or the compounded vowels can be further split into single vowels. Generally the division of phonemes by using consonants plus vowels is accurate enough for the method of the embodiment. Phoneme confusion matrix is calculated based on the statistics of recognition results, and is a quantitive measure of the confusion degree of each phoneme pairs, i.e. a measure of acoustic similarity from the perspective of speech recognition. Two phonemes that have similar pronunciation are very close in the sense of acoustic distance, e.g. Mandarin phonemes "in" and "ing" are very similar in pronunciation and "in" tends to be mis-recognized as "ing" and "ing" tends to be mis-recognized as "in". So, if such pronunciation difference occurs between the phoneme sequence of output segment and the phoneme sequence of the key word, its contribution to acoustic distance is relatively small, and on the contrary the contribution to acoustic distance is relatively large if the pronunciation difference of the two phoneme is big.

Since Mandarin is a tonal language, the comparing of tone sequence can be added into the calculation of acoustic distance, and the acoustic distance is preferably weighted by using a tone confusion matrix.

In the embodiment, acoustic distance of the phoneme sequence and acoustic distance of the tone sequence are preferably added through certain weight, for example, weight of the two are set as w and 1−w, respectively. If only calculation of acoustic distance of the phoneme sequence is considered, it corresponds to the scenario of w=1. Further, an average acoustic distance of a single character, a single syllable or a single phoneme is obtained by dividing the acoustic distance between the segment of the speech recognition result and the key word by the number of characters, syllables or phonemes of the key word.

Next, the process of calculating the average acoustic distance will be described in detail in conjunction with FIG. 4. As shown in FIG. 4, the description will be made by taking the segment "茶 {cha2} 果 {guo3}" and the key word "叉管 {cha1guan3}" for example.

First, based on a phoneme sequence "ch, a, g, uo" of the segment "茶 {cha2} 果 {guo3}" and a phoneme sequence "ch, a, g, uan" of the key word "叉管 {cha1guan3}", a phoneme acoustic distance of the two is calculated, during calculation, an acoustic distance between each phoneme pair is weighted by using a phoneme confusion matrix.

Second, based on a tone sequence "2, 3" of the segment "茶 {cha2} 果 {guo3}" and a tone sequence "1, 3" of the key word "叉管 {cha1guan3}", a tone acoustic distance of the two is calculated, during calculation, an acoustic distance between each tone pair is weighted by using a tone confusion matrix.

Third, weights of the phoneme acoustic distance and the tone acoustic distance are set as w and 1−w respectively, and a weighted average of the two is calculated as the acoustic distance between the segment and the key word.

Fourth, an average acoustic distance of a single character, a single syllable or a single phoneme is obtained by dividing the acoustic distance between the segment and the key word by the number of characters '2', the number of syllables '2' or the number of phonemes '4' of the key word.

Returning to FIG. 2, next, in step 210, the average acoustic distance calculated in step 205 is compared to a first threshold TH1, and the process proceeds to step 215 in a case that the average acoustic distance is smaller than the TH1, otherwise, the process proceeds to step 225.

In step 215, a language model score of the segment "茶 {cha2} 果 {guo3}" is compared to a second threshold TH2. The language model score of the segment "茶 {cha2} 果 {guo3}" is based on the language model score LMS3 of the word "茶 {cha2}" and the language model score LMS4 of the word "果 {guo3}" of the segment, for example, a product of the two is taken as the language model score of the segment.

In step 215, the process proceeds to step 220 in a case that the language model score is smaller than the TH2, otherwise, the process proceeds to step 225.

In step 220, the segment "茶 {cha2} 果 {guo3}" is replaced with the key word "叉管 {cha1guan3}. In step 225, the segment "茶 {cha2} 果 {guo3}" is retained without replacement.

The method of the embodiment for optimizing a speech recognition result, by optimizing key words wrongly recognized in the speech recognition result 10 through a key word list 20, is capable of improving quality of the speech recognition result, and improving performance of the speech recognition system, particularly a meeting assistant system. The method of the embodiment does not involve modification to the speech recognition engine and is easy to be implemented, it has small computation cost and is very convenient in application. To add or modify the key words, it only needs to modify the corresponding key word list file.

The method of the embodiment is capable of increasing accuracy of replacement by preferably only replacing those segments with low LM score. Furthermore, because the LM score is obtained by utilizing data already existed in the speech recognition result, computation cost is very small. The method of the embodiment is capable of further reducing computation cost by preferably only performing calculation on those segments with low LM score. In the method of the embodiment, because calculation of the acoustic distance is preferably through character level or word level processing, computation cost is very small.

<Apparatus for Optimizing a Speech Recognition Result>

Figure 5:
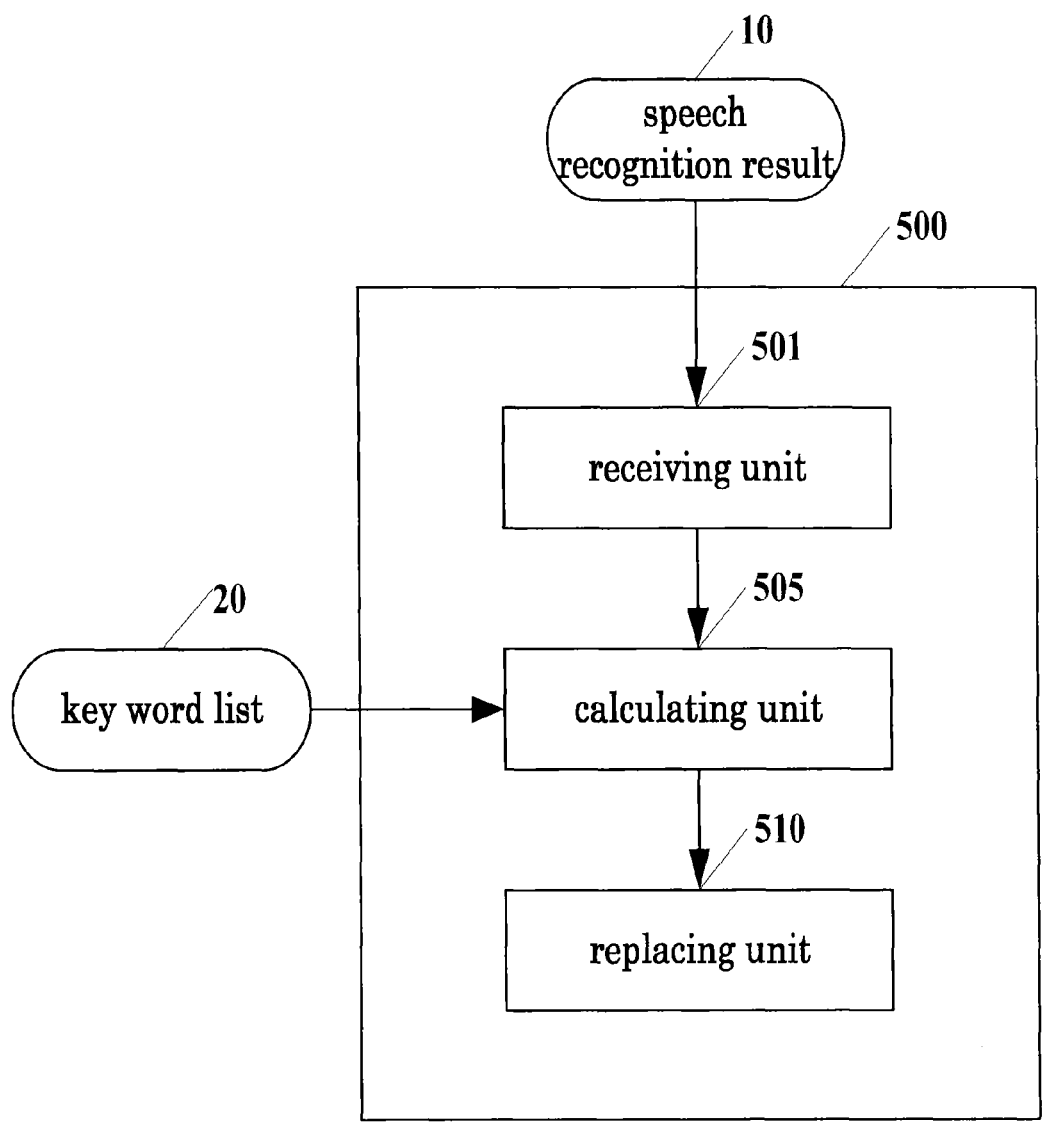
FIG. 5 shows a block diagram of an apparatus for optimizing a speech recognition result according to another embodiment of the present invention.

Based on the same concept of the invention, FIG. 5 shows a block diagram of an apparatus for optimizing a speech recognition result according to another embodiment of the present invention. Below, the embodiment will be described with reference to the figure. The parts which are the same with those of the embodiment above will be omitted appropriately.

As shown in FIG. 5, the apparatus 500 of the embodiment for optimizing a speech recognition result comprises: a receiving unit 501 configured to receive a speech recognition result; a calculating unit 505 configured to calculate a pronunciation similarity between a segment of the speech recognition result and a key word in a key word list; and a replacing unit 510 configured to replace the segment with the key word in a case that the pronunciation similarity is higher than a first threshold.

In the embodiment, the receiving unit 501 receives a speech recognition result 10 from a speech recognition engine.

In the embodiment, the speech recognition result 10 received by the receiving unit 501 can be a result obtained through any speech recognition engine or system known by those skilled in the art and can be a speech recognition result of any language such as Chinese, English, Japanese etc., and the present invention has no limitation on this.

In the embodiment, the calculating unit 505 calculates a pronunciation similarity between a segment of the speech recognition result 10 and a key word in a key word list 20.

In the embodiment, the segment of the speech recognition result includes a word of the speech recognition result, a combination of a plurality of neighboring words of the speech recognition result, or a combination of a plurality of neighboring characters of the speech recognition result.

In the embodiment, the process for the calculating unit 505 to calculate a pronunciation similarity is actually a process of matching the speech recognition result with the key word list, that is, a process of capturing wrongly output segment of the speech recognition result by using the key word list.

The calculating unit 505 preferably conducts matching from beginning of the speech recognition result, until matching is done for all the recognition result. Furthermore, to reduce calculation cost, it is also possible to match only a segment of the speech recognition result whose language model score is lower than the second threshold with the key word list. The language model score of the segment of the speech recognition result may be calculated based on a language model score of a word related to the segment, and the language model score of the word of the speech recognition result is data existing in the speech recognition result.

Specific example of matching the speech recognition result with the key word list by the calculating unit 505 is as shown in FIG. 3, detailed content of which is the same as the description made in conjunction with FIG. 3 and will be omitted here for brevity.

The method of matching the speech recognition result with the key word list by the calculating unit 505 may utilize the word level fuzzy matching method or the character level fuzzy matching method described in the above step 105 and description of which will be omitted here. Specific algorithm for the above matching methods may preferably be a dynamic planning algorithm, which may efficiently reduce time consumed by the algorithm.

In the embodiment, the pronunciation similarity between the segment and the key word refers to similarity degree of pronunciation of the two, which is preferably calculated through acoustic distance of the two. The smaller the acoustic distance of the two is, the higher the similarity degree of the two is. Calculation of acoustic distance will be described below in detail in conjunction with figures.

In the embodiment, the segment is replaced with the key word by the replacing unit 510 in a case that the pronunciation similarity between the segment and the key word is higher than a first threshold.

In the embodiment, the first threshold and the second threshold may be set according to actual needs and the embodiment has no limitation thereto.

Next, a preferred embodiment of the apparatus for optimizing a speech recognition result of the invention will be described in detail. In the embodiment, the receiving unit 501 receives a speech recognition result 10.

In the embodiment, the calculating unit 505 calculates an average acoustic distance between the segment of the speech recognition result 10 and the key word in the key word list 20.

In the embodiment, calculation of acoustic distance is to compare difference between a phoneme sequence of the segment of the speech recognition result 10 and a phoneme sequence of the key word, preferably, acoustic distance between each phoneme pair is weighted by a phoneme confusion matrix. Phoneme is a basic unit of pronunciation, for Mandarin language, the phonemes can be pinyins, or the pinyins can be split into consonants (Initials) and vowels (Finals), or the compounded vowels can be further split into single vowels. Generally the division of phonemes by using consonants plus vowels is accurate enough for the apparatus of the embodiment. Phoneme confusion matrix is calculated based on the statistics of recognition results, and is a quantitive measure of the confusion degree of each phoneme pairs, i.e. a measure of acoustic similarity from the perspective of speech recognition. Two phonemes that have similar pronunciation are very close in the sense of acoustic distance, e.g. Mandarin phonemes "in" and "ing" are very similar in pronunciation and "in" tends to be mis-recognized as "ing" and "ing" tends to be mis-recognized as "in". So, if such pronunciation difference occurs between the phoneme sequence of output segment and the phoneme sequence of the key word, its contribution to acoustic distance is relatively small, and on the contrary the contribution to acoustic distance is relatively large if the pronunciation difference of the two phoneme is big.

Since Mandarin is a tonal language, the comparing of tone sequence can be added into the calculation of acoustic distance, and the acoustic distance is preferably weighted by using a tone confusion matrix.

In the embodiment, acoustic distance of the phoneme sequence and acoustic distance of the tone sequence are preferably added through certain weight, for example, weight of the two are set as w and 1−w, respectively. If only calculation of acoustic distance of the phoneme sequence is considered, it corresponds to the scenario of w=1. Further, an average acoustic distance of a single character, a single syllable or a single phoneme is obtained by dividing the acoustic distance between the segment of the speech recognition result and the key word by the number of characters, syllables or phonemes of the key word.

Next, the process of calculating the average acoustic distance by the calculating unit 505 will be described by taking the segment "茶 {cha2} 果 {guo3}" and the key word "又管 {cha1guan3}" for example First, based on a phoneme sequence "ch, a, g, uo" of the segment "茶 {cha2} 果 {guo3}" and a phoneme sequence "ch, a, g, uan" of the key word "又管 {cha1guan3}", a phoneme acoustic distance of the two is calculated, during calculation, an acoustic distance between each phoneme pair is weighted by using a phoneme confusion matrix.

Second, based on a tone sequence "2, 3" of the segment "茶 {cha2} 果 {guo3}" and a tone sequence "1, 3" of the key word "又管 {cha1guan3}", a tone acoustic distance of the two is calculated, during calculation, an acoustic distance between each tone pair is weighted by using a tone confusion matrix.

Third, weights of the phoneme acoustic distance and the tone acoustic distance are set as w and 1−w respectively, and a weighted average of the two is calculated as the acoustic distance between the segment and the key word.

Fourth, an average acoustic distance of a single character, a single syllable or a single phoneme is obtained by dividing the acoustic distance between the segment and the key word by the number of characters '2', the number of syllables '2' or the number of phonemes '4' of the key word.

In the embodiment, the apparatus 500 further comprises a comparing unit configured to compared the average acoustic distance calculated by the calculating unit 505 to a first threshold TH1, and the comparing unit continues to compare a language model score of the segment "茶 {cha2} 果 {guo3}" to a second threshold TH2 in a case that the average acoustic distance is smaller than the TH1. The language model score of the segment "茶 {cha2} 果 {guo3}" is based on the language model score LMS3 of the word "茶 {cha2}" and the language model score LMS4 of the word "果 {guo3}" of the segment, for example, a product of the two is taken as the language model score of the segment.

The replacing unit 510 replaces the segment "茶 {cha2} 果 {guo3}" with the key word "又管 {cha1guan3} in a case that the language model score is smaller than the TH2. The replacing unit 510 does not perform replacement and retains the segment "茶 {cha2} 果 {guo3}" in a case that the average acoustic distance is larger than or equal to the TH1 or the language model score is larger than or equal to the TH2.

The apparatus of the embodiment for optimizing a speech recognition result, by optimizing key words wrongly recognized in the speech recognition result 10 through a key word list 20, is capable of improving quality of the speech recognition result, and improving performance of the speech recognition system, particularly a meeting assistant system. The apparatus of the embodiment does not involve modification to the speech recognition engine and is easy to be implemented, it has small computation cost and is very convenient in application. To add or modify the key words, it only needs to modify the corresponding key word list file.

The apparatus of the embodiment is capable of increasing accuracy of replacement by preferably only replacing those segments with low LM score. Furthermore, because the LM score is obtained by utilizing data already existed in the speech recognition result, computation cost is very small. The apparatus of the embodiment is capable of further reducing computation cost by preferably only performing calculation on those segments with low LM score. In the apparatus of the embodiment, because calculation of the acoustic distance is preferably through character level or word level processing, computation cost is very small.

Those skilled in the art can appreciate that, the method and apparatus above may be implemented by using computer executable instructions and/or including into processor control codes, which is provided on carrier media such as disk, CD, or DVD-ROM, programmable memory such as read only memory (firmware) or data carrier such optical or electronic signal carrier. The method and apparatus of the embodiment may also be implemented by semiconductor such as super large integrated circuit or gate array, such as logic chip, transistor, or hardware circuit of programmable hardware device such as field programmable gate array, programmable logic device and so on, and may also be implemented by a combination of the above hardware circuit and software.

Although the method and apparatus for optimizing a speech recognition result of the invention has been described in detail in conjunction with detailed embodiments, the invention isn't limited thereto, and those skilled in the art may make various changes, replacements and modifications to the invention without departing from the spirit and scope of the invention; the protection scope of the invention is defined by the appended claims.

What is claimed is:

1. An apparatus for optimizing a speech recognition result, comprising:
    a computer that, by using computer executable instructions,
        receives a speech recognition result from a speech recognition engine,
        calculates a phoneme acoustic distance between a phoneme sequence of a segment of the speech recognition result and a phoneme sequence of a key word in a keyword list,
        calculates a tone acoustic distance between a tone sequence of the segment and a tone sequence of the key word,
        calculates a weighted average of the phoneme acoustic distance and the tone acoustic distance,
        calculates an average acoustic distance which is obtained by dividing the weighted average by the number of characters, syllables or phonemes of the key word,
        calculates a language model score of the segment, based on a language model score of each word in the segment,
        replaces the segment with the key word in a case that the average acoustic distance is lower than a first threshold and the language model score is lower than a second threshold, and
        outputs the speech recognition result of which the segment is replaced with the keyword to the speech recognition engine.

2. The apparatus according to claim 1, wherein
    the computer calculates the average acoustic distance between a segment of the speech recognition result, in which a language model score of the segment is lower than the second threshold, and a key word in the key word list.

3. The apparatus according to claim 1, wherein
    the computer calculates the phoneme acoustic distance between the phoneme sequence of the segment and the phoneme sequence of the key word by using a phoneme confusion matrix as a weight.

4. The apparatus according to claim 1, wherein
    the computer calculates the tone acoustic distance between the tone sequence of the segment and the tone sequence of the key word by using a tone confusion matrix as a weight.

5. A method for optimizing a speech recognition result, comprising steps of:
    receiving a speech recognition result from a speech recognition engine;
    calculating a phoneme acoustic distance between a phoneme sequence of a segment of the speech recognition result and a phoneme sequence of a key word in a keyword list;
    calculating a tone acoustic distance between a tone sequence of the segment and a tone sequence of the key word;
    calculating a weighted average of the phoneme acoustic distance and the tone acoustic distance;
    calculating an average acoustic distance which is obtained by dividing the weighted average by the number of characters, syllables or phonemes of the key word;
    calculating a language model score of the segment, based on a language model score of each word of the segment;
    replacing the segment with the key word in a case that the average acoustic distance is lower than a first threshold and the language model score is lower than a second threshold; and
    outputting the speech recognition result of which the segment is replaced with the keyword to the speech recognition engine.

* * * * *